Patented June 19, 1923.

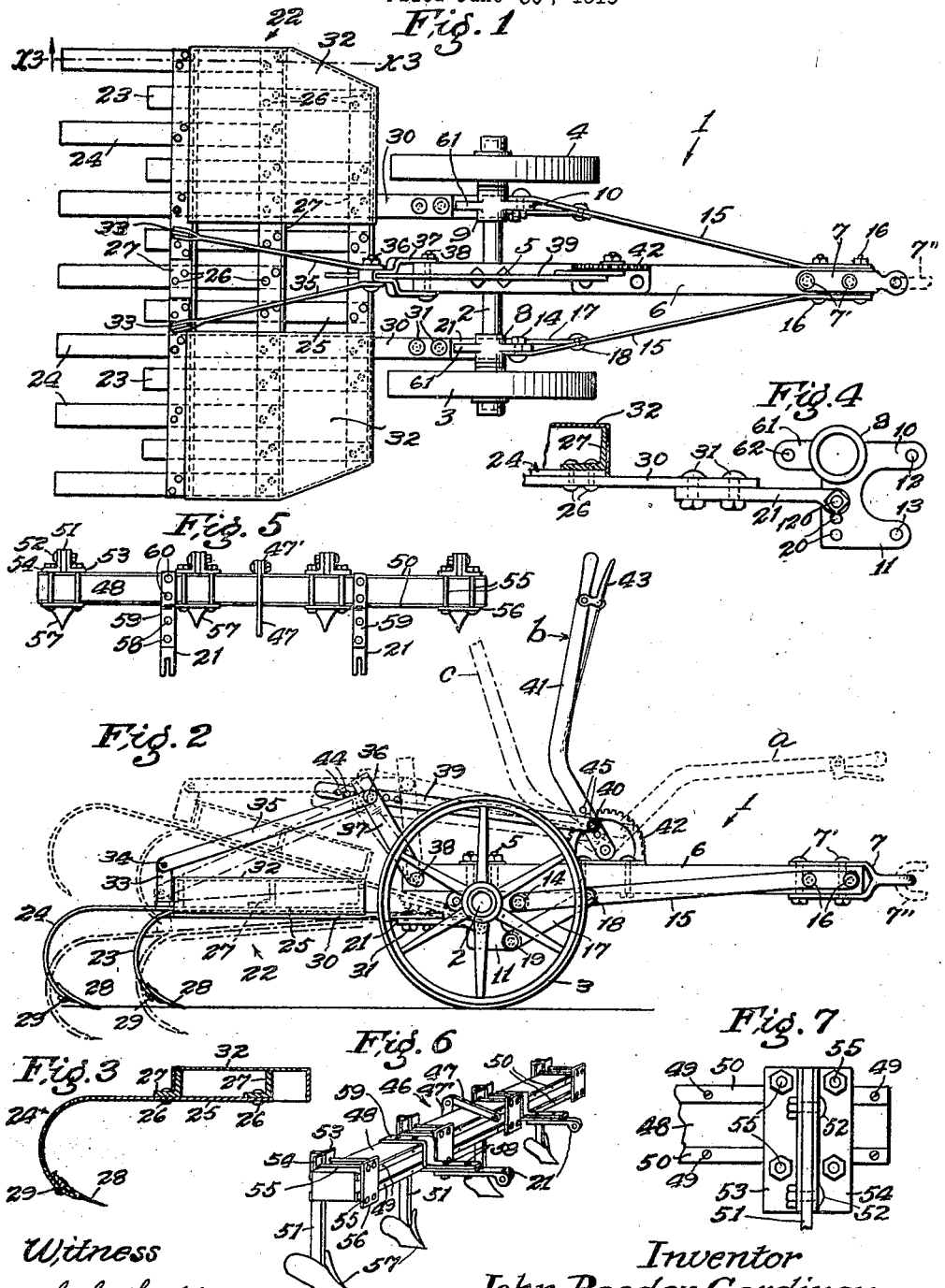

1,459,393

UNITED STATES PATENT OFFICE.

JOHN REEDER GARDINER, OF FULLERTON, CALIFORNIA.

INTERCHANGEABLE CULTIVATING AND TRENCH-FORMING APPARATUS.

Application filed June 30, 1919. Serial No. 307,794.

*To all whom it may concern:*

Be it known that I, JOHN REEDER GARDINER, a citizen of the United States, residing at Fullerton, in the county of Orange and State of California, have invented a new and useful Interchangeable Cultivating and Trench-Forming Apparatus, of which the following is a specification.

This invention relates to apparatus for the cultivation and irrigation of orchards; and it may be said to consist in the provision of the novel features and in the improved construction, combination and arrangement of parts, the purpose of which will be apparent to those skilled in the art from a consideration of the preferred form of construction herein shown, described and claimed.

The principal object of this invention is to provide an apparatus that can first be used to break up and pulverize the ground around the trees; and which can then be easily and quickly replaced by a furrower attachment whereby a plurality of spaced irrigating trenches can be formed in the mellowed ground.

With the foregoing object in view a pole truck is provided that can be drawn by a tractor or by any other well known means and interchangeable with this pole truck is a cultivator and furrower.

While this apparatus is especially designed for work in orchards it is not intended that it be limited to that purpose as the apparatus is adapted to all uses involving cultivation and trench forming.

Another object of the invention is to provide the pole truck with means whereby the cultivator or furrower are elevated to a position entirely above the ground when transported from place to place so that their cutting points will not contact with and mar the road; also a means is provided whereby the points can be thrown into the ground with the full weight of the pole truck including the ground wheels applied to the cultivator or furrower points.

Another object of the invention is to provide the cultivator with shielded ends so as to protect the low hanging limbs of the trees which shields prevent the limbs from entangling with the cross bar mechanism of the cultivator.

Another object of the invention is to provide the furrower with means whereby the trenching plows can be located at different points or moved along the cross beam to make room for additional plows; or for removing part of the plows and spacing those remaining.

The invention includes novel means for raising or lowering either the cultivator or the furrower.

Other objects, advantages and features of the invention may appear from the accompanying drawings, the subjoined detailed description and the appended claims.

The accompanying drawing illustrates the invention.

Figure 1 is a plan view of the pole truck with a cultivator attached thereto, also showing by dotted line a clevis that can be attached to a tractor, not shown.

Fig. 2 is a side elevation of what is shown in Fig. 1, with altered position of the cultivator and lever shown by dotted line.

Fig. 3 is a section on line $x^3$ of Fig. 1.

Fig. 4 is a side elevation of one of the draw-bar connections.

Fig. 5 is a plan view of the furrower attachment.

Fig. 6 is a perspective view of the furrower attachment.

Fig. 7 is a rear view of one end of the furrower cross beam, showing the means for attaching the plow beams thereto.

In detail the pole truck 1 has the axle 2 on the ends of which are loosely mounted the wheels 3 and 4. At the center of the axle 2 there is secured by the U bolt 5 the pole or tongue 6 which pole at its forward end is provided with the clevis 7 that is secured thereto by bolts 7'; also a clevis 7'' is shown in dotted lines by which means the truck is attached to a tractor not shown.

On each side of the pole 6 and near to the wheels 3 and 4 are the draw-bar connections 8 and 9, which latter have the hub portions thereof shrunk to the axle so as to hold them securely in place.

Each of these connections 8 and 9 have integral therewith the forward flanges 10 and 11, which flanges are provided with the holes 12 and 13. To the flanges 10 there are secured by the bolts 14 one end of the braces 15 which braces have their other end secured to the pole or tongue 6 by the bolts 16.

Short braces 17 have one end thereof secured to the braces 15 by rivet 18, and the other end of the short braces 17 is secured to the flanges 11 by the bolt 19.

In the downward extending portion of the flanges 11 are a plurality of holes 20 that are adapted to register with similar bolt holes in the draw-bars 21 that are secured to a cultivator 22; and these draw-bars 21 and the flanges 11 are detachably connected by the bolts 120.

The cultivator 22 is formed of a plurality of spring bars 23 and 24, that have an upper straight portion 25 that is secured by the rivets 26 to the angle irons 27. As best shown in Fig. 1 the bars 23 are secured to the middle and forward angle irons 27 and the bars 24 are secured to the middle and the rear angle irons 27, which construction forms a substantially rigid frame.

The spring bars 23 and 24 are curved downward and have on their lower ends the cultivator points 28 which points are secured by bolts 29 to the lower ends of the bars 23 and 24. Also secured to all three of the angle irons 27 are the bars 30 to which are secured, by the bolts 31, the draw-bars 21, see Figs. 1, 2 and 4.

The ends of the cultivator 22 are enclosed with the sheet metal covering 32, which covering can be secured to the frame by any well known means; and the purpose of this covering is to protect the limbs of trees by preventing them from becoming entangled with the frame of the cultivator. Also it will be noted that the forward portion of the cultivator has its corners cut away so that it forms a deflector for any low hanging branches. Secured to the rear most angle iron 27 are the arms 33 to which are pivotally connected by the pins 34 one end of the connecting bars 35. The other ends of the connecting bars 35 are pivotally connected by the bolt 36 to an inverted U-shaped strut 37 which strut has its lower ends straddling the pole and being pivotally connected by the bolt 38 to the rear portion of the tongue 6. By this construction the strut will be held in an upright position and eliminates side strain of the strut on the pole that causes undue wear and binding of the parts. Passing through the upper end of the strut 37 is the bar 39 which bar has one end thereof pivotally connected by the bolt 36 to the strut 37. The other end of the bar 39 is pivotally connected by the pin 40 to the lever 41, which lever is provided with a sector plate 42 and finger latch 43. The construction and operation of latch and sector plate are well known and not described in detail.

The bar 39 has in its rearward end a plurality of holes 44 that are adapted to register with the bolt holes in the strut 37 whereby the parts can be shifted when it is desired to adjust the parts to either raise or lower the cultivator points; also this adjustment is accomplished by shifting the end of the bar 39 to register with the holes 45 in the operating lever 41. From the foregoing it can readily be seen that there are a plurality of adjustments of parts whereby the cultivator points can be raised or lowered.

As seen in Fig. 2 when the operating lever 41 is in the dotted position $a$ the cultivator and its associated parts will be elevated clear of the ground, in which position the apparatus can be transported from place to place without contacting or marring the roadway over which it is drawn; and when the lever 41 is in the full line position $b$ the plow points will contact with the ground; and when the lever is moved to the dotted position $c$ the points will be forced downward into the ground.

Also when the draw-bars 21 are attached to the lowest holes 20 on the flanges 11, the cutivator points will be correspondingly lowered after which the operation of the lever 43 from the full line position $b$ to the dotted line position $c$ will force the points still farther into the ground, and also throw the weight of the pole truck onto the points. The ground wheels 3, 4 regulating the depth to which the cultivator points are forced into the ground by the weight of the pole truck after the lever has been set at a predetermined point.

A forward or backward movement of the lever 41, through the medium of the bar connections 39, 35 changes the angularity of the strut 37 and raises or lowers the ground working implement. By pivotally connecting the strut 37 to the truck in rear of the pivotal connection of the ground working implement, and extending said strut upwardly and rearwardly of said truck when the said implement is engaged with the ground, an upward and forward movement of said strut serves to raise the said implement with an increased leverage.

From the foregoing it can be seen that by removing the bolts 120 and 36 the cultivator 22 is quickly and easily detached from the pole truck 1; after which the furrower 46 or any ground working implement can be attached to the pole truck by replacing the bolts 120 in connection to the furrower as will be hereafter described.

The furrower is preferably formed of the wooden cross beam 48 which has on each side thereof and near the top and bottom edges a pair of metal strips 50 that are secured in place by the screws 49.

The metal standards 51 have their upper end secured by the bolts 52 to the angle plates 53 and 54, which angle plates normally abut the rearward portion of the cross beam 48 and are held thereto by a plurality of bolts 55; which bolts pass through plates 56 on the forward side of the cross beam 48 and these bolts are positioned so that there is a sliding fit between the contacting surface of the bolts and the cross beam, by which mounting the plow beams 51 can be moved along the cross beam 48 to any desired position, when the bolts 52 are loosened; but which are held securely in place when the bolts are tightened, also as many of these plow beams can be attached to the cross beam as desired; or they can be as easily removed one independently of the other.

The plow beams 51 have furrowing plows 57 at their lower end, which are of common construction and well known, and are not described in detail; their purpose however is to form a deep and wide trench for the purpose of irrigating.

The draw-bars 21 of the furrower 48 are secured by the bolts 58 to a plate 59 which latter is secured by the bolts 60 to the cross beam 48.

The means of attaching the furrower to the truck are similar to the attachments connecting the cultivator to the truck except that the draw-bars 21 are secured to the rearward flange 61 on the draw-bar connections 8 and 9. The flanges 61 have the holes 62 therein that are adapted to register with the holes through the draw-bars 21, which parts can be secured together by the bolts 120, also a bar 47 has one end pivotally connected to an arm 47' that is secured to the cross plate 48; and the other end of the bar 47 is pivotally connected by the bolt 36 to the strut 37; by which connection the furrower 46 is raised and lowered by the lever 41 substantially as is cultivator heretofore described.

I claim.

1. In a cultivating apparatus comprising a truck having an axle, draw-bar connections secured to the axle, and cultivator implements adapted to be pivotally connected to said draw-bar connections; means to elevate and lower said cultivator implements; said means having a lever mounted on said truck in advance of the axle, a strut pivotally mounted on said truck rearwardly of said axle; a bar pivotally connecting the lever with said strut, and detachable means for connecting a ground working implement to said strut.

2. In an apparatus of the character described the adjusting means for ground working implements pivotally attached to said apparatus, a pole, a lever pivotally mounted on said apparatus, an inverted U-shaped strut straddling said pole and being pivotally connected thereto, a bar pivotally connecting the lever with said strut, and detachable means for pivotally connecting a ground working implement to said strut.

3. In an apparatus of the character described having a truck and a pole; the raising and lowering means substantially set forth comprising a lever pivotally mounted on said pole; an inverted U-shaped strut straddling said pole and being pivotally connected thereto; a bar pivotally connecting the lever with said strut; and another bar pivotally connecting said strut to a ground working implement of said apparatus.

4. In combination with a cultivator having a truck provided with an axle and a ground working implement pivotally connected to the axle of said truck, of a lever pivotally mounted on said truck and in advance of the pivotal connection of said implement, an inverted U-shaped strut pivotally connected to said truck rearwardly of the pivotal connection of said implement, said strut extending upwardly and rearwardly of said truck when said ground working implement engages the ground, and connections between said lever and said strut and between said strut and said ground working implement for raising and lowering said ground working implement.

In testimony whereof, I have hereunto set my hand at Los Angeles, California, this 21st day of June, 1919.

JOHN REEDER GARDINER.

Witness:
W. M. GENTLE.